US006824844B1

(12) United States Patent
Kondo et al.

(10) Patent No.: US 6,824,844 B1
(45) Date of Patent: Nov. 30, 2004

(54) INK JET RECORDING MEDIUM

(75) Inventors: Hiromasa Kondo, Urawa (JP); Masaki Nishimura, Yokohama (JP); Takaaki Koro, Chiba (JP)

(73) Assignee: OJI Paper Co. Ltd., Tokyo (JP)

( * ) Notice: Subject to any disclaimer, the term of this patent is extended or adjusted under 35 U.S.C. 154(b) by 0 days.

(21) Appl. No.: 09/516,624

(22) Filed: Mar. 1, 2000

(30) Foreign Application Priority Data

Mar. 2, 1999 (JP) .......................................... 11-053746

(51) Int. Cl.[7] .................................................. B32B 3/00

(52) U.S. Cl. ............................... 428/32.37; 428/32.38; 347/105

(58) Field of Search ................................ 428/195, 206, 428/307.3, 312.6, 323, 331, 32.37, 32.38; 347/105

(56) References Cited

U.S. PATENT DOCUMENTS

| | | | | | |
|---|---|---|---|---|---|
| 5,320,897 | A | * | 6/1994 | Kondo et al. | 428/195 |
| 5,496,634 | A | * | 3/1996 | Ogawa et al. | 428/341 |
| 5,589,259 | A | | 12/1996 | Hosoi et al. | 428/323 |
| 5,856,001 | A | * | 1/1999 | Okumura et al. | 428/331 |
| 6,180,219 | B1 | * | 1/2001 | Hoshino et al. | 428/312.2 |
| 6,242,082 | B1 | * | 6/2001 | Mukoyoshi et al. | 428/212 |
| 6,632,488 | B2 | * | 10/2003 | Okumura et al. | 428/32.25 |

FOREIGN PATENT DOCUMENTS

| | | |
|---|---|---|
| EP | 0 803 374 A2 | 10/1997 |
| EP | 0 827 841 A1 | 3/1998 |
| JP | A-52-53012 | 4/1977 |
| JP | A-53-49113 | 5/1978 |
| JP | 55051583 | 4/1980 |
| JP | 56148585 | 11/1981 |
| JP | 58110287 | 6/1983 |
| JP | 59185690 | 10/1984 |
| JP | 6114584 | 6/1986 |

OTHER PUBLICATIONS

"Development and Application of Dynamic Scanning Absorptometer," Japan Tappi Journal, vol. 48, No. 5, May 1994, pp. 88–92.

* cited by examiner

*Primary Examiner*—B. Shewareged
(74) *Attorney, Agent, or Firm*—Arent Fox Kintner Plotkin Kahn

(57) ABSTRACT

An ink jet recording medium, capable of recording thereon ink images having excellent clarity and sharpness without blotting of ink images, includes an ink receiving layer formed on a support material and containing xerogel porous pigment particle, and has a such a specific feature that when a plurality of ink dots are formed each by successively jetting three coloring ink droplets different in color from each other and equal in droplet volume to each other toward a point of the ink receiving layer, to successively superpose the jetted three coloring ink droplets and to form a mixed colored dot in the point, the average size of the resultant dots is 125% or less based on an average dot size of ink dots each formed from two different coloring ink droplets.

5 Claims, No Drawings

INK JET RECORDING MEDIUM

BACKGROUND OF THE INVENTION

1. Field of the Invention

The present invention relates to an ink jet recording medium. More particularly, the present invention relates to an ink jet recording medium having an excellent ink absorption and a superior reproducibility of ink images with a high resolving power for the ink images.

2. Description of the Related Art

An ink jet recording system, in which an aqueous ink is jetted imagewise through a fine opening of a jetting nozzle toward a recording material to form ink images, is advantageous in that printing noise is low, full colored images can be easily recorded, the recording can be effected at a high speed, and the ink jet printer is cheaper than other printers, and thus the application of the ink jet recording system has progressed in many fields including, for example, terminal printers for computers, facsimile machines, plotters, and book and slip printers.

Generally, conventional woodfree paper sheets and coated paper sheets exhibit a poor ink absorption and thus the ink images printed of the above-mentioned paper sheets are retained in an undried condition for a long time and thus cause the printing apparatus, printed sheets and the printed ink images to be stained by the undried ink images. Thus, the conventional woodfree paper sheets and coated paper sheets are not practically useful for the ink jet printing. To solve these problems, Japanese Unexamined Patent Publication No. 52-53,012 discloses an ink jet recording paper sheet having a low degree of sizing, and Japanese Unexamined Patent Publication No. 53-49,113 discloses an ink jet recording sheet produced by impregnating a paper sheet containing an internally added urea-formaldehyde resin with a water soluble polymeric material. Also, Japanese Unexamined Patent Publications No. 55-51583 and No. 56-148,585 disclose an ink jet recording sheet having a coating layer formed on a substrate paper sheet and comprising a certain type of porous inorganic pigment particles, for example, amorphous silica particles, for the purpose of enhancing the color density and the reproducibility of the printed ink images.

Further, for the purpose of obtaining ink images having a high sharpness with a high resolution while preventing or restricting blotting of ink, Japanese Unexamined Patent Publications No. 58-110,287, No. 59-185,690 and No. 61-141,584 respectively disclose an improvement of the physical properties of the porous pigment particles. The improved porous pigment particles contribute to enhancing the recording properties of the recording sheet to a certain extent.

Currently, ink jet printing technology has been significantly advanced, and in a recent technology, the resultant quality of the ink jet printed images is comparable to that of the silver salt photographic images. Thus, the demands on the quality of the ink jet recording media become stronger than before. Particularly, in ink jet recording printers using an ink having a low concentration of dye, which ink is referred to as a photo ink, there is a tendency that the photo ink is applied in an increased amount to the recording medium.

To cope with the tendency, the recording medium must have a high ink absorbing capacity.

The ink absorbing capacity of the recording medium can be increased by the following means.

(1) The ink receiving layer is formed in an increased amount.

(2) The content of a binder to be contained in the ink receiving layer is increased.

(3) In the ink receiving layer, pigment particles having an increased pore volume are contained.

(4) In the ink receiving layer, pigment particles having a decreased range of distribution in the particle size are contained.

(5) The degree of sizing of the substrate paper sheet is decreased to cause the ink to easily permeate into the substrate paper sheet.

The means (1) is disadvantageous in that the resultant ink receiving layer exhibits a reduced surface strength, and thus a degraded pencil-writing property and the ink images recorded in the ink receiving layer exhibit a decreased color density.

The means (2) and (3) are disadvantageous in that the ink receiving layer exhibits a reduced surface strength and a degraded pencil-writing property.

Regarding means (4), it is difficult to find a pigment, for example a silica pigment, having a narrow range of pigment particle size distribution and capable of causing the ink images recorded in the ink receiving layer to have an increased color density and the ink receiving layer to exhibit an enhanced pencil-writing property.

The means (5) is disadvantageous in that the resultant substrate paper sheet exhibits a decreased resistance to penetration of a coating liquid for the ink receiving layer thereinto and as a result, the resultant ink receiving layer exhibits a reduced surface strength.

Further, when the ink-absorbing capacity is increased, the ink is rapidly absorbed in the resultant ink receiving layer while the ink applied to the ink receiving layer does not fully spread in the ink receiving layer, and thus the size of the resultant ink dots tends to become small. When the size of the ink dots is too small, the intervals between the ink dots become large and the color density of the resultant ink images is reduced.

SUMMARY OF THE INVENTION

An object of the present invention is to provide an ink jet recording medium having a sufficient ink absorbing capacity in practice and capable of recording thereon ink images having high color density, clarity and sharpness with a high resolution.

Another object of the present invention is to provide an ink jet recording medium capable of recording thereon ink images having high clarity and sharpness with a high reproducibility, sufficient surface strength as an office recording sheet, a good pencil-writing property and a good erasing property, for pencil marks, using an erasing rubber.

The above-mentioned objects can be attained by the ink jet recording medium of the present invention.

The ink jet recording medium of the present invention comprises a support material and at least one ink receiving layer formed on the support material and comprising xerogel porous pigment particles, wherein a plurality of ink dots, each of which dots are formed by jetting three coloring ink droplets different in color from each other and equal in droplet volume to each other, toward a point of the ink receiving layer, to form a dot having a mixed color produced from the three coloring ink droplets superposed on each other at the point of the ink receiving layer, have an average dot size of 125% or less, based on an average size of ink dots, each of which dots are formed by jetting a droplet of each of the three different coloring inks having a droplet volume equal to that of each of the above-mentioned three coloring ink droplets, toward a point of the ink receiving layer, to form a dot having a single color of each ink.

In the ink jet recording medium of the present invention, the average dot size of the dots each formed from the three coloring ink droplets is preferably 110% or less, based on the average size of dots each formed by jetting two of the three coloring ink droplets toward a point of the ink receiving layer to form a dot having a mixed color of the two coloring ink droplets.

In the ink jet recording medium of the present invention, the xerogel porous pigment preferably comprises at least two types of amorphous silica particles different in specific surface area from each other, the highest specific surface area amorphous silica particles having a BET specific surface area of 300 to 900 $m^2/g$ and the lowest specific surface area amorphous silica particles having a BET specific surface area of 150 to 450 $m^2/g$ and less than that of the highest specific surface area amorphous silica particles.

The ink jet recording medium of the present invention preferably has a density of 0.70 to 0.90 $g/cm^3$.

The ink jet recording medium of the present invention exhibits, when distilled water is brought into contact with the ink receiving layer, a distilled water-absorption of 30 $g/m^2$ or more in a contact time of 10 ms determined by a dynamic scanning absorptometer.

In the method of recording colored images on the ink jet recording medium of the present invention using an ink jet recording machine and at least one member selected from the group consisting of yellow coloring inks, cyan coloring inks, magenta-coloring inks and black coloring inks, the ink can be applied in a maximum ink-applying amount of 20 $ml/m^2$ or more, to the ink jet recording medium, by the recording machine.

The average dot size of the ink dots formed on the ink jet recording medium can be determined by using a trade available dot analizer (model: DA-5000, made by OJI KEISOKUKIKAI K.K.).

DESCRIPTION OF THE RELATED ART

When an ink jet recording medium is recorded by using an ink jet recording printer, as printing inks, black coloring ink and three substractive primary coloring inks, namely cyan, magenta and yellow-coloring inks, are used. In response to a desired color, other coloring inks, for example, light cyan, light magenta and other coloring inks may be additionally employed. The inks contain, as a coloring material, at least one member selected from direct dyes, acid dyes, and coloring pigments, and optionally a wetting agent, a dye-dissolving agent, an antiseptic agent, and/or antifungl agent.

When desired colors are formed from the four coloring inks, for example, red color is formed by mixing magenta with yellow in an equivalent amount, green color is formed by mixing yellow color with cyan color in an equivalent amount, and blue color is formed by mixing cyan color with magenta color in an equivalent amount. For example, when a red-colored dot is formed on a recording medium, a magenta-colored dot and a yellow-colored dot are superposed on each other; when a green-colored dot is formed, a yellow-colored dot and a cyan-colored dot are superposed on each other on the recording medium; and when a blue-colored dot is formed, a cyan-colored dot and a magenta-colored dot are superposed on each other on the recording medium, to mix the two colors.

In these cases, each of the mixed colored dots is formed from two different substractive primary coloring ink droplets having a droplet volume the same as each other and jetted toward a focus point on the recording medium. Thus the volume of the ink necessary to form each of the mixed colored dots is 200% based on the ink volume necessary to form each of the superposed dots of the substractive primary colors.

Namely, the mixed colored dot formed from two different colored dots superposed on each other will be referred to a 200% coloring ink-superposed dot, hereinafter.

When a gray-colored image is formed in a desired color density, the gray-colored dots are formed from three substractive primary coloring inks (namely, cyan, magenta and yellow-coloring inks). In this case, the gray-colored dot is formed three coloring ink droplets different in color from each other and equal in volume to each other. The gray colored dot will be referred to a 300% coloring ink-superposed dot, hereinafter.

When the three substractive primary coloring ink droplets are used in the same volume as each other to form a mixed colored dot, the resultant dot is black-colored in theory. The black color formed from the three substractive primary colors is referred to as a composite black color which is distinguished from a simple black color.

In the present invention, the recording medium must record thereon coloring ink images having a high clarity and sharpness by using an ink jet recording printer. For this purpose, when a plurality of ink dots are formed on an ink receiving layer in such a manner that each dot is formed by successively jetting three coloring ink droplets different in color from each other and equal in droplet volume to each other toward a point of the ink receiving layer to form a dot having a mixed color produced from the three coloring ink droplets superposed on each other at the point of the ink receiving layer, the resultant ink dots must have an average dot size of 125% or less, preferably 120% or less, based on the average size of ink dots each formed on the ink receiving layer by jetting a droplet of each of the three different coloring inks having a droplet volume equal to that of each of the above-mentioned three coloring ink droplets, toward a point of the ink receiving layer, to form a dot having a single color of each ink. The single colored ink dot will be referred to as a 100% single coloring ink dot.

When the average dot size of the 300% coloring ink superposed dot is more than 125% based on the average dot size of the single coloring ink dots, the difference in dot size between the 300% coloring ink superposed dots and the single coloring ink dots such as cyan, magenta and yellow-colored dots is too large, and thus the resultant ink images exhibit an unsatisfactory quality such as insufficient clarity and sharpness. Namely, when the pitch of the individual dots is designed in response to the average dot size of the 100% single coloring ink dots, and composite black-colored dots are printed, the resultant ink images exhibit reduced clarity and sharpness and appeared to be blotted images. Also when the dot pitch is designed in response to the average dot size of the too large composite black-colored dots, no blotting of the images due to the composite black-colored dots is formed. However, the gaps between the 100% single coloring ink dots are too large and the resultant image exhibits a reduced apparent color density. Therefore, the average dot size of the 300% superposed coloring ink images has to be 125% or less, preferably 120% or less, of the average dot size of the 100% single coloring ink dots.

Also, when the average dot size of the 300% superposed coloring ink dots (composite black-colored dots) is compared with average dot size of 200% superposed coloring ink dots (namely red-colored dots produced from magenta-color ink droplets and-yellow-coloring ink droplets, green-colored dots produced from yellow-coloring ink droplets and cyan-coloring ink droplets, and blue-colored dots produced from cyan-coloring ink droplets and magenta-coloring ink droplets, it is preferable that the average dot size of the 300% superposed coloring ink dots be 110% or less, based-on the average dot size of the 200% superposed coloring ink dots.

When the average dot size of the 300% superposed coloring ink dots is controlled to a level of 110% or less of the average dot size of the 200% superposed coloring ink dots, the resultant ink jet recording medium can record thereon ink images having high clarity and sharpness without blotting of the ink even in the case where the recording medium is employed in a printer applying the ink in a large amount. The total amount of the ink employed in the 300% superposed coloring ink dots is 3/2 times the total amount of the ink employed in the 200% superposed coloring ink dots. The ink amount ratio 3/2 is smaller than that ratio 2/1 between the 200% superposed coloring ink dots and the 100% single coloring ink dots. However, the ratio in the dot size between the 300% superposed coloring ink dots and the 200% superposed coloring ink dots is, sometimes, higher than that between the 200% superposed coloring ink dots and the 100% single coloring ink dots. This phenomenon is derived from the fact that, for example, when the ink is applied in an amount larger than the maximum ink absorbing capacity of the recording medium, the over-applied amount of the ink, even if it is very small, causes the recorded ink image to be significantly blotted. Accordingly, the average dot size of the 300% superposed coloring ink dots must be controlled in response to the average dot size of the 100% single coloring ink dots and optionally that of the 200% superposed coloring ink dots, to prevent the blotting of the ink images.

Again, it should be emphasized that the recording medium for the high resolution ink jet printer must have such a performance that the average dot size of the 300% superposed coloring ink dots is 125% or less, preferably 120% or less, based on the average dot size of the 100% single coloring ink dots, and optionally is 110% or less, based on the average dot size of the 200% superposed coloring ink dots. Thus the controlled ink jet recording medium of the present invention exhibits a high resistance to blotting of the ink images received thereon and records thereon ink images having an excellent image quality.

Usually, the individual ink droplets for the 100 single coloring ink dots have a weight of 0.08±0.03 $\mu$g and form ink dots having a dot size of 100 to 120 $\mu$m.

The dot size of the ink images can be controlled by controlling the type or composition and content of a pigment component, the type or composition and content of a binder component and optionally the type or composition and the content of a wetting agent in the ink receiving layer.

In the ink jet recording medium of the present invention, the xerogel porous pigment contained in the ink receiving layer can be produced by utilizing the conventional processes, for example, (1) processes in which a hydrogel-forming substance, for example, aluminum hydroxide, alumina, silica or magnesium oxide is used as a starting material; a hydrogel produced from the starting material is dried to provide a xerogel, and the resultant xerogel is pulverized and classified;

(2) processes in which a hydrogel material is granulated into a size of desired secondary or tertiary agglomerate particles, the particles are dried, and heat-treated to promote the sintering and/or crystallization of the particles and to strengthen the agglomeration-bonding of the primary particles of the resultant oxide; and (3) processes in which fine pigment particles having a desired secondary particle size are produced by a procedure in which a urea-formaldehyde resin or melamine-formaldehyde or resin is produced in a fine particle suspension liquid containing colloidal silica or colloidal alumina, while controlling the resin-producing constitutions, and then are dried and, optionally, are sintered.

Among the above-mentioned pigments, the silica pigments have a relatively low refraction index and the porous structure of the silica pigments can be easily controlled. Thus the silica pigments exhibit an excellent ink-receiving property and contribute to enhancing the color density of the recorded ink images, and are advantageously used for the ink jet recording medium.

The ink receiving layer optional contains, in addition to the xerogel pigments, additional pigments, for example, another inorganic pigments, for example, calcium carbonate, kaolin, talc, calcium sulfate, barium sulfate, titanium dioxide, zinc oxide, satin white, aluminum silicate, diatomaceons earth, calcium silicate, magnesium silicate, white carbon, alumina, and aluminum hydroxide; and organic pigments, for example, styrene polymer pigments, acrylic polymer pigments, urea-formaldehyde resin pigments, melamine-formaldehyde resin pigments and benzoguanamine-formaldehyde resin pigments.

The binder for the ink receiving layer can be selected from conventional binder materials, for example, natural and semi-synthetic polymeric materials, for example, starch, starch derivatives, for example, oxidized starch, and cation-modified starchs, cellulose derivatives, for example, carboxymethyl cellulose, hydroxyethylcellulose, and hydroxypropylmethylcellulose, casein, gelatin and soybean protein; polyvinyl alcohol and polyvinyl alcohol derivatives, for example, silyl-modified polyvinyl alcohol, poly(vinyl butyral) resins, polyethyleneimine resins, poly(vinyl pyrrolidone) resins, poly(acrylic acid) resins, poly (methacrylic acid) resins, poly(acrylate ester) resins, polyamide resins, polyacrylamide resins, polyester resins, urea-formaldehyde resins, melamine-formaldehyde resins, styrene-butadiene copolymers, methyl metacrylate-butadiene copolymers, and ethylene-vinyl acetate copolymers; and modified polymers and copolymers of the above-mentioned polymers and copolymers with anionic or cationic modifying agents. These polymers and copolymers may be employed in the state of an aqueous solution or dispersion or emulsion. Usually, the binder is contained in a content of 20 to 100 parts by weight per 100 parts by weight of the pigment component.

In the ink jet recording medium of the present invention, the role of the binder contained in the ink receiving layer is not only to bind the pigment particles to each other through the binder but also to control the penetration of the ink into the ink receiving layer. Generally, when the content of the binder in the ink receiving layer is too low, the resultant ink receiving layer may exhibit a low surface strength and thus the ink receiving layer may be easily peeled off and the peeled flakes cause the recording medium not to be smoothly fed to or delivered from the printer and the ink jetting nozzle of a recording head to be blocked, and when the content of the binder is too high, the gaps between the pigment particles are excessively filled by the binder and thus the ink absorption rate of the ink receiving layer is decreased, the resultant ink images are easily blotted and the inside of the printer is stained by the ink not fixed to the recording medium.

However, in the case where the ink contains a solvent medium having a high wetting property for the binder in the ink receiving layer, or a high swelling or dissolving property for the binder of the ink receiving layer, the binder should be contained in an increased content in the ink receiving layer, to prevent or restrict the blotting of the ink images and to obtain sharp ink images. Namely, the best type and content of the binder should be established in response not only to the type and content of the pigment but also to the type of the ink applied to the ink receiving layer.

Further, for the purpose of enhancing the water resistance of the ink images formed from an aqueous ink, and of controlling the viscosity of the coating liquid for the ink receiving layer, the ink receiving layer optionally contains a cationic polymeric material comprising at least one member selected from, for example, polyethyleneimine resins, polyamine resins, polyamide resins, poly(amide-epichlorohydrin) resins, poly(amine-epichlorohydrin) resins, polyamidepolyamineepichlorohydrin resins, polydidiallylamine resins and dicyandiamide resins. Still further, the ink receiving layer optionally contains an additive comprising at least one member selected from, for example, pigment-dispersing agents, viscosity-modifiers, anti-foaming agents, defoaming agents, foaming agents, releasing agents, penetrants, wetting agents, thermo-gelatinizing agents, lubricants and other conventional auxiliary agents for the ink jet recording media.

The coating amount of the ink receiving layer is not limited to a specific level and can be established in response to the desired quality of the ink images recorded in the ink receiving layer. When the coating amount is large, the resultant ink receiving layer is difficult to exhibit both a satisfactory pencil-writing property and a high quality of the recorded ink images. Therefore, the coating amount of the ink receiving layer is preferably designed in the range between 3 $g/m^2$ and 40 $g/m^2$. When the coating amount is less than 3 $g/m^2$, the resultant ink receiving layer may be difficult to exhibit a high reproducibility of ink images having a high clarity and sharpness, but a satisfactory pencil-writing property of the resultant ink receiving layer can be easily obtained. Also, when the coating amount is more than 40 $g/m^2$, the resultant ink receiving layer may have a reduced surface strength and the ink images recorded thereon may exhibit an unsatisfactory color density, when the coating amount falls outside of the above-mentioned range, the resultant ink receiving layer may be unsatisfactory.

In the ink jet recording medium of the present invention, the ink receiving layer, or an uppermost layer when the ink receiving layer has a multi-layered structure, preferably contains at least two types of xerogel porous pigment particles different in specific surface area from each other. Preferably, the xerogel porous pigment particles having a highest specific surface area are porous amorphous silica particles having a specific surface area of 300 to 900 $m^2/g$, and the xerogel porous pigment particles having a lowest specific surface area are porous amorphous silica particles having a specific surface area of 150 to 450 $m^2/g$ and less than that of the highest specific surface area amorphous silica particles.

The highest specific surface area amorphous silica particles contribute to enhancing the pencil-writing property and pencil mark-erasing property, using an erasing rubber, of the resultant ink receiving layer. Also, the lowest specific surface area amorphous silica particles contribute to enhancing the color images of the recorded ink images and the ink-absorbing capacity of the ink receiving layer.

There is no specific limitation to the mixing ratio of the highest specific surface area amorphous silica particles to the lowest specific surface area amorphous silica particles, and the mixing ratio can be varied in response to the properties required to the ink receiving layer. However, there is a trend that the higher the content of the highest specific surface area amorphous silica particles, the larger the size of the resultant ink dots, and the higher the content of the lowest specific surface area amorphous silica particles, the smaller the size of the resultant ink dots. Accordingly, in consideration of the resolution of the printer and the jetting rate of the ink, a large size of the ink dots is needed, the content of the highest specific surface area silica particles is preferably increased.

In connection with the highest specific surface area amorphous silica particles having a specific surface area of 300 to 900 $m^2/g$, it should be noted that the amorphous silica particles having a specific surface area of less than 300 $m^2/g$ exhibit a very low contribution to enhancing the pencil-writing property, and another amorphous silica particles having a specific surface area of more than 900 $m^2/g$ causes the resultant ink receiving layer to exhibit a reduced ink-absorption capacity and thus exhibit a reduced contribution to enhancing the ink absorption of the ink receiving layer. Also, when the pigment component for the ink receiving layer consists of only the amorphous silica particles having the specific surface area of more than 900 $m^2/g$, the resultant ink receiving layer may exhibit an unsatisfactory ink absorption capacity and thus the recorded ink images may have an insufficient color density, but the pencil-writing property and pencil mark-erasing property using an erasing rubber of the resultant ink receiving layer may be excellent.

In connection to the amorphous silica particles having a specific surface area of 150 to 450 $m^2/g$, it should be noted that amorphous silica particle having a specific surface area of less than 150 $m^2/g$ may cause the resultant ink receiving layer to exhibit an unsatisfactory surface strength and other amorphous silica particles having a specific surface area of more than 450 $m^2/g$ may cause the resultant ink receiving layer to exhibit too low an ink-absorption capacity and an unsatisfactory ink-drying rate, and thus the ink images are easily blotted. Also, when the pigment component for the ink receiving layer consists of only the amorphous silica particles having a specific surface area of more than 450 $m^2/g$, the resultant ink receiving layer may exhibit an unsatisfactory ink absorption capacity and may be able to record thereon the ink images having a satisfactory color density, but the pencil-writing property and a pencil mark-erasing property using an erasing rubber may be satisfactory. Therefore, the amorphous silica particles having a specific surface area falling outside of the range of from 150 to 450 $m^2/g$ are not suitable for recording the ink images with a high resolution.

The ink receiving layer may have a two or more-layered structure. As mentioned above, the xerogel porous pigment for the ink receiving layer is preferably selected from silica pigment. Preferably, the uppermost surface layer of the two or more-layered ink receiving layer contains, as a main component, the xerogel porous amorphous silica pigment particles. Also, another layer closer to the support material, (namely an undercoat layer) of the multi-layered ink receiving layer preferably comprises the xerogel porous pigment together with a non-xerogel pigment.

In this case, the pigment particles for the undercoat layer located close to the support material preferably comprise 25 to 75% by weight of non-xerogel pigment particles having an oil absorption of 50 ml/100 g or less and an average particle size of 1 to 15 $\mu$m and 25 to 75% by weight of xerogel porous pigment particles having an oil absorption of 100 ml/100 g or more and an average particle size of 1 to 15 $\mu$m. When the content of the xerogel porous pigment particles in the undercoat layer close to the support material is less than 25% by weight, the resultant undercoat layer may exhibit an insufficient ink absorption capacity, and thus a solvent medium component in the portion of the ink not absorbed in the undercoat layer is absorbed in the support material and swells the fibers in the support material. Thus, when the ink is applied in a large amount to the recording medium, the printed recording medium may be corrugated. This corrugating phenomenon on the recording medium is referred to as “a cockling phenomenon”. Alternatively, the portion of the ink not absorbed in the undercoat layer may be retained in uppercoat layer or layers, and may cause the ink images to blot due to the insufficient ink absorption capacity of the ink receiving layer so that the quality of the ink images is deteriorated. Still alternatively, the resultant ink receiving layer may exhibit an insufficient ink absorbing rate and the unabsorbed portion of the ink may stain the rollers in the printer and/or another piece of the recording medium following the printed piece of the recording medium.

To prevent the above-mentioned defects of the undercoat layer containing the xerogel porous pigment in an amount of less than 25% by weight, it is necessary that the ink receiving layer be formed in a significantly increased amount. The large coating amount of the ink receiving layer causes not only the coating procedure to be difficult and the cost to be high, but also the color density of the recorded images to be low and the surface strength of the resultant ink receiving layer to be reduced. Therefore, the ink receiving layer in the large amount is disadvantageous in the quality of the resultant ink jet recording medium.

When the content of the xerogel porous pigment is more than 75% by weight, the resultant undercoat layer close to the support material may exhibit too high a water absorption and thus the uppercoat layer or layers may exhibit a relatively reduced water-retention. Therefore, when the uppercoat layer or layers are formed by coating, various defects in coating operation and in appearance, for example, formation of streaks and scratches and unevenness in coating result may occur.

In the present invention, the ink jet recording medium preferably has a density of 0.7 to 0.90 $g/cm^3$ or more, more preferably 0.7 to 0.85 $g/cm^3$, determined in accordance with Japanese Industrial Standard (JIS) P 8118. When the density is less than 0.70 $g/cm^3$, the surface of the resultant ink receiving layer may have too low a hardness and may be easily scratched. Also, when the density is more than 0.90 $g/cm^3$, the resultant ink receiving layer may be too dense and may have too low an ink absorption capacity, and a poor ink-drying rate, thus the recorded ink images may be easily blotted. Particularly, if the ink receiving layer contains a combination of the amorphous silica particles having a specific surface area of 300 to 900 $m^2/g$ with the amorphous silica particles having a specific surface area of 150 to 450 $m^2/g$, there is a tendency that the higher the density of the recording medium, the lower the color density of the ink images received in the recording medium. When the density is more than 0.90 $g/cm^3$, the recorded ink images may exhibit a low color density and thus the resultant recording medium may not record ink images having a high quality.

In order to obtain an ink jet recording medium not only capable of recording thereon ink images having high clarity and sharpness with high resolution and reproducibility, but also having a good pencil-writing property and a good pencil mark-erasing property using an erasing rubber, the ink receiving layer preferably is provided with at least a surface portion (uppermost layer) thereof containing at least two types of xerogel porous silica pigment particles different in specific surface area from each other, the highest specific surface area silica pigment particles having a BET specific surface area of 300 to 900 $m^2/g$ and the lowest specific surface area silica pigment particles having a BET specific surface area of 150 to 450 $m^2/g$ and less than that of the highest specific surface area silica pigment particles; and the ink jet recording medium preferably has a density of 0.70 to 0.90 $g/cm^3$, determined in accordance with JIS P 8118.

The ink receiving layer can be formed by using conventional coating means, for example, size-presser, gate roll coater, roll coater, bar coater, air knife coater, rod blade coater, and blade coater. Also, the ink receiving layer is preferably formed by a gravure coater, die coater, lip coater and curtain coater in which the coating amount of the coating liquid is controlled before coating. This type of coater can prevent or restrict an undesirable selective absorption of the coating liquid by the support material and thus the ink receiving layer can be uniformly formed. Therefore, these coaters are preferably employed for forming the ink receiving layer of the present invention.

The support material of the ink jet recording medium of the present invention is selected from various types of paper sheets and polymer films.

The paper sheets for the support material contain a pulp component which comprises at least one member selected from chemical pulps, for example, softwood kraft pulps (NBKP); and hardwood kraft pulps (LBKP); mechanical pulps, for example, GP, BCTMP and MP; non-wood pulps, for example, kenaf pulps, and other pulps, for example, DIP. The pulp component is optionally added with synthetic fibers, for example, polyolefin fibers, for example, polyethylene fibers, polypropylene fibers, ethylene-propylene copolymer fibers, polystyrene fibers, ethylene-vinyl acetate copolymer fibers; halogen-containing polymer fibers, for example, polyvinyl chloride fibers and polyvinylidene fibers; polyamide fibers, for example, 6-nylon fibers and 66-nylon fibers; aliphatic polyester fibers, for example, polyethylene succinate fibers, polycaprolactone fibers, polylactic acid, and plyhydroxybutyrate-valerate copolymer fibers; and water-insoluble polyvinyl alcohol fibers.

Also, the paper sheets for the support material optionally contain a filler comprising at least one member selected from inorganic pigments, for example, talc, kaolin, calcined kaolin, calcium carbonate, white carbon, amorphous silica, diatomoceous earth, titanium dioxide, actuated clay and barium sulfate; and organic pigments, for example, urea-formaldehyde resin, nylon powder, and polyethylene powder. The pigment-containing paper sheets can be produced by an acid paper-forming method or a neutral paper-forming method. Among the above-mentioned pigments, the calcined kaolin, white carbon, amorphous silica, and urea-formaldehyde resin, which are porous pigments, exhibit a high ink-absorbing property and thus are preferably employed for the present invention.

The paper sheets for the support material optionally contain a sizing agent comprising at least one member selected from, for example, rosin sizing agents, alkenyl succinate anhydride, and alkyl-ketene dimers; and a binder comprising at least one member selected from starch derivatives, for example, oxidized starch, enzyme-modified starches, cation modified starches, esterified starches, etherified starches; cellulose derivatives, for example, methylcellulose, ethylcellulose, carboxymethylcellulose, methoxycellulose, and hydroxycellulose; fully and partially saponified polyvinyl alcohols and polyvinyl alcohol derivatives, for example, carboxy-modified polyvinyl alcohols and silicon-modified polyvinyl alcohols; water-soluble synthetic polymers, for example, polyacrylamide, polyvinylpyrrolidone, acrylic acid amide-acrylate ester copolymers, acrylic acid amide-acrylate ester-methacrylte ester copolymers, alkali metal salts of styrene-maleic anhydride copolymers, alkali metal salts of isobutylene-maleic anhydride copolymers and casein; and latices of water-insoluble polymers, for example, polyvinyl acetate, polyurethanes, polyacrylates, polymetacrylates, polybutyl methacrylate, styrene-butadiene copolymers, vinyl chloride-vinyl acetate compolymers and styrene-butadiene-acrylic compound copolymers.

The sizing agent binder may be added to the paper sheet by an internal addition method in which the binder is added to a pulp slurry or an external addition method in which the binder is coated or sized on a paper sheet.

The resin film for the support material is selected from transparent resin films and opaque resin films. The opaque resin films may be produced by melt-extruding a mixture of a film-forming thermoplastic resin with fine inorganic pigment particles to form a undrawn film, and monoaxially or diaxially drawing the undrawn film to form a plurality of fine voids in the film and to provide a paper-like opaque resin film. The thermoplastic resin is preferably selected from polyester resins and polyolefin resins. The polyester resins include polyethylene terephthalate resins, polybutylene terephthalate resins, and polycyclohexene terephthalate resins, and the polyolefin resins include polyethylene, polypropylene, ethylenepropylene copolymers, and ethylenevinyl acetate copolymers. These resins may be used alone or in a mixture of two or more thereof. The resin film for the support material may have a single layered structure or a multi-layered structure.

Due to the development of an ink jet recording printer having an enhanced resolving power, the pitches between the jetted ink dots become smaller and, as a result, the amount of the jetted ink per unit area of the recording medium was increased. Also, to smoothly present ink images in a moderate tone, a technology of employing inks having a low concentration of coloring material was developed. Under these circumstances, the ink jet recording medium is required to have a high ink-fixing property for preventing the blotting of the ink toward the outside of the ink dots, even when the ink having a low concentration of the coloring material is applied in a large amount. In the above-mentioned recording system, the amount of the ink applied to the recording medium reaches at maximum 20 $ml/m^2$ or more, particularly 30 $ml/m^2$ or more. In the recording medium having an ink receiving layer formed on a support sheet consisting of a conventional paper sheet, the ink absorbing amount is adjusted to 100 $ml/m^2$ or less.

The ink jet recording medium of the present invention can be employed for the specific purpose of providing ink images having excellent quality even when a recent ink jet recording technology, in which the ink is applied in a large amount, is applied to the recording medium to form colored images having a moderate tone with a high degree of resolution, and thus the recording medium must rapidly absorbs the ink applied in a large amount to the recording medium.

The absorption of the ink droplets on the ink jet recording medium is known as a property of the recording medium influencing the quality of the recorded ink images. The absorption behavior of the ink droplets in the recording medium can be measured by a conventional measurement method, for example, the Bristow's method or apparatus for liquid absorption of paper sheets. However, the conventional measurement method is not suitable to accurately measure the absorption behavior of the ink droplets occurred within a very short time. A dynamic scanning absorptometer (DSA), (disclosed by SHIGENORI KUGA, in "JAPAN TAPPI JOURNAL", volume 48, pages 88 to 92, May, 1994) solved the defects of the conventional ink absorption testers and can measure with a high accuracy the rapid ink-absorption behavior of an ink jet recording medium within a very short time. In the dynamic scanning absorptometer, the ink-absorption rate of the recording medium can be automatically measured by directly measuring a liquid absorption rate from a movement of a meniscus in a capillary, by forming a specimen into a disc form, spirally scanning a liquid absorption head, automatically changing the scanning rate in accordance with a predetermined pattern, and repeating the measurement procedure a desired number of times on only one speciment. The liquid-supply head for a paper sheet specimen is connected to a capillary through a polyethylenetetrafluoroethylene tube, and the position of the meniscus in the capillary is automatically read by a photosensor. In the DSA measurement, the absorption rate of a distilled water absorbed in a recording medium is measured by such a method in which a piece of an ink jet recording medium is fixed on a horizontal turntable revolving at a fixed revolution rate, a slit having a predetermined width and length is brought into contact with the recording medium, distilled water is continuously transmitted to the recording medium through the slit, and the amount of the distilled water transmitted to the recording sheet in a contact time of 10 ms is measured.

In the present invention, the amount of the distilled water transmitted to the recording medium in the contact time of 10 ms is preferably 30 ml/m$^2$ or more, more preferably 40 ml/m$^2$, determined by the dynamic scanning absorptometer. In this case, the resultant ink jet recording medium of the present invention can record thereon ink images having excellent clarity and sharpness with a high resolution. There is no specific upper limit to the distilled water absorption rate. Usually, the distilled water absorption rate is preferably not more than 80 ml/m$^2$·10 ms. The distilled water absorption rate can be measured by the above-mentioned dynamic scanning absorptometer which utilizes the same measurement principle as that of the conventional Bristow's method, includes certain improvements and can measure very rapid absorption behavior of the recording medium with the ink droplets. The DSA is available from KYOWA SEIKO K.K.

Where the liquid absorption in a very short contact time of 10 ms is measured by the conventional Bristow's method, the head box for feeding an ink may be brought into an incomplete contact with the recording medium, the resultant ink images may become blurred, the ink-transmitted area of an ink jet recording paper sheet having a light liquid absorption may become too small, the end portion of the ink-transmitted area may have a swallow tail form due to change in the form of the ink droplet surface, and thus a measurement error may be increased.

To prevent the above-mentioned error in the conventional Bristow's method, the liquid absorption rate in a short contact time is determined from the measurement data obtained over a longer contact time than 10 ms by extrapolation. In this case, when the measurement is applied to a recording paper sheet having a high liquid absorption rate, and the contact time is made longer, it becomes necessary to consider the change in the liquid absorption behavior of the recording paper sheet, and thus it is difficult to determine the liquid amount transmitted within a short contact time to the recording sheet, by extrapolation.

In the present invention, the distilled water-absorption is determined by a Dynamic Scanning Absorptometer in which the influence of the liquid surface form can be neglected by carrying out continuously the liquid absorption, and thus the liquid amount transmitted within a short contact time to the recording medium can be measured with a high accuracy.

EXAMPLE

The present invention will be further illustrated by the following examples which are merely representative and are not intended to restrict the scope of the present invention in any way.

In each of the examples and the comparative examples, the resultant ink jet recording sheet was subjected to the following tests.

(1) Ink Dot-forming Property

Ink dot-forming property of the ink jet recording sheet was tested and evaluated by using an ink jet-printer produced the inventors of the present invention themselves.

The printer could form 100% single cyan, magenta or yellow-coloring ink dots, 200% superposed red (magenta+yellow), green (yellow+cyan) or blue (cyan+magenta) coloring ink dots and 300% superposed black (composite black, cyan+magenta+yellow) coloring ink dots, on the recording sheet.

(2) Measurement of Dot Size

The size of printed ink dots was measured by using a dot analyzer (model: DA-5000, made by OJI KEISOKU KIKI K.K.). This dot analyzer was suitable for automatically measuring the size of dots printed on a recording sheet and calculating an average of the measured data. For obtaining the average dot size, 20 samples were employed for each of a 100% single cyan-coloring ink, a 200% superposed blue (cyan+magenta) coloring ink and a 300% superposed black (composite black, cyan+magenta+yellow) coloring ink.

(3) Evaluation of Resistance to Blotting of Ink Images

For the evaluation of resistance to blotting of the ink images, the same ink jet printer as that used for the evaluation of ink dot-forming property was used.

Coloring ink dots were printed in a block pattern at a dot density of 4000 dpi, and the blotting of ink in the boundary regions between coloring ink dots different in color from each other. In the 100% single coloring ink dots, the ink blotting in the boundary regions between the 100% single cyan-coloring ink dots and the 100% single magenta-coloring ink dots was evaluated. In the 200% superposed coloring ink dots, the ink blotting in the boundary regions between the 200% superposed red (magenta+yellow) coloring ink dots and the 200% superposed green (cyan+yellow) coloring ink dots was evaluated. In the 300% superposed coloring ink dots, the ink blotting in the boundary regions between the 300% superposed black (composite black, cyan+magenta+yellow) coloring ink dots and the 200% superposed red (magenta+yellow) coloring ink dots was evaluated.

The evaluation results were divided into the following classification

| Class | Ink blotting |
|---|---|
| A | Substantially no ink blotting is found |
| B | Certain ink blotting occurs but usable in practice |
| C | Significant ink blotting occurs and not usable in practice. |

(4) Water-transmittance

An absorption of distilled water by a recording sheet was measured by a dynamic scanning absorptometer (made by KYOWA SEIKO K.K., and the measurement results are shown in a graph. The amount of the distilled water transmitted to the recording sheet within a contact time of 10 ms was calculated in accordance with the graph.

Example 1

A coating liquid for forming an ink recording layer was prepared by dispersing a mixed silica particles of 30 parts by weight of amorphous silica particles having a specific surface area of 280 $m^2/g$ and an average particle size of 5.5 $\mu$m (trademark: FINESIL X-60, made by K.K. KOKUYAMA), with 70 parts by weight of amorphous silica particles having a specific surface area of 400 $m^2/g$ and an average particle size of 8 $\mu$m (trademark: CARPREX BS-304N, made by SHIONOGI SEIYAKU K.K.), and 30 parts by solid weight of a 10% aqueous solution of silyl-modified polyvinyl alcohol (trademark: R-1130, made by K.K. KURARAY) in water by stirring; adding, to the aqueous dispersion, 5 parts by weight of a cationic polyacrylamide resin (trademark: SAFTMER ST-3300, made by MITSUBISHI KAGAKU K.K.) and 25 parts by weight of a cation-modified urethane resin latex (trademark of ADECABONTITER HUX-670, made by ASAHI DENKAKOGYO K.K.). The resultant coating liquid had a total solid content of 18% by weight.

The coating liquid was coated on a surface of a woodfree paper sheet having a basis weight of 80 $g/m^2$ and a stöckigt sizing degree of 12 seconds by using a mayer bar to form an ink receiving layer having a dry weight of 10 $g/m^2$, and dried. The resultant ink jet recording layer surface of the coated paper sheet was smoothed by a super calender treatment. An ink jet recording medium having a density of 0.75 $g/cm^3$ determined in accordance with Japanese Industrial Standard (JIS) P 8118.

The test results are shown in Table 1.

Example 2

An ink jet recording medium was produced by the same procedures as in Example 1 with the following exceptions.

In the preparation of the coating liquid for the ink receiving layer, the cation-modified urethane resin latex was replaced by a cation-modified acrylic resin latex (trademark: NK POLYMER AC-13, made by SHINNAKAMURA KAGAKU K.K.).

The test results are shown in Table 1.

Example 3

An ink jet recording medium was produced by the same procedures as in Example 1 with the following exceptions.

In the preparation of the coating liquid for the ink receiving layer, the cation-modified urethane resin latex was replaced by a cation-modified acrylic resin latex (trademark: BANARESIN MO-1, made by SHINNAKAMURA KAGAKU K.K.).

The test results are shown in Table 1.

Example 4

An ink jet recording medium was produced by the same procedures as in Example 1 with the following exceptions.

In the preparation of the coating liquid for the ink receiving layer, the silyl-modified polyvinyl alcohol was employed in an amount of 35 parts by solid weight, no cationic polyacrylamide resin was employed and the cation-modified urethane resin latex was replaced by a styrene-butadiene copolymer latex (trademark: NIPPOL OX-1060, made by HIHON ZEON K.K.).

The test results are shown in Table 1.

Example 5

An ink jet recording medium was produced by the same procedures as in Example 1 with the following exceptions.

In the preparation of the coating liquid for the ink receiving layer, the silyl-modified polyvinyl alcohol was employed in an amount of 25 parts by weight, and the cation-modified urethane resin latex was replaced by 30 parts by weight of a vinyl chloride-vinyl acetate copolymer latex (trademark: WBV-110, made by UNION CARBIDE JAPAN K.K.).

The test results are shown in Table 1.

Example 6

An ink jet recording medium was produced by the same procedures as in Example 1 with the following exceptions.

In the preparation of the coating liquid for the ink receiving layer, the mixed silica particles were replaced by 100 parts by weight of amorphous silica particles having a specific surface area of 250 $m^2/g$ and an average particle size of 9 $\mu$m (trademark: CARPREX BS-312N, made by SHIONOGI SEIYAKU K.K.), and the cation-modified urethane resin latex-was replaced by a vinyl chloride-vinyl acetate-copolymer latex (trademark: WBV-110, made by UNION CARBIDE JAPAN K.K.).

The test results are shown in Table 1.

Example 7

An ink jet recording medium was produced by the same procedures as in Example 1 with the following exceptions.

In the preparation of the coating liquid for the ink receiving layer, the mixed silica particles were replaced by 100 parts by weight of amorphous silica particles having a specific surface area of 400 $m^2$/g and an average particle size of 8 μm (trademark: CARPREX BS-304N, made by SHIONOGI SEIYAKU K.K.), the silyl-modified polyvinyl alcohol was employed in an amount of 35 parts by raid weight and the cation-modified urethane resin latex was replaced by a vinyl chloride-vinyl acetate-copolymer latex (trademark: WBV-110, made by UNION CARBIDE JAPAN K.K.).

The test results are shown in Table 1.

Comparative Example 1

An ink jet recording medium was produced by the same procedures as in Example 1 with the following exceptions.

In the preparation of the coating liquid for the ink receiving layer, the amount of the silyl-modified polyvinyl alcohol was changed to 35 parts by solid weight, the amount of the cationic polyacrylamide resin (trademark: SAFTMER ST-3300, made from MITSUBISHI KAGAKU K.K.) was changed to 5 parts by solid weight, and the cation-modified urethane resin latex was replaced by 20 parts by weight of a cation-modified acrylic resin (trademark: DM-20A, made by ASAHI DENKAKOGYO K.K.).

The test results are shown in Table 1.

Comparative Example 2

An ink jet recording medium was produced by the same procedures as in Example 1 with the following exceptions.

In the preparation of the coating liquid for the ink receiving layer, the amount of the amorphous silica particles having a specific surface area of 280 $m^2$/g and an average particle size of 5.5 μm (trademark: FINESIL X-60, made by K.K. TOKUYAMA) was changed to 40 parts by weight, the amount of the amorphous silica particles having a specific surface area of 400 $m^2$/g and an average particle size of 8 μm (trademark: CARPREX B5-304N, made by SHIONOGI SEIYAKU K.K.) was changed to 60 parts by weight, the amount of the silyl-modified polyvinyl alcohol was changed to 35 parts by solid weight, the amount of the cationic polyacrylamide resin (trademark: SAFTMER ST-3300, made by MITSUBISHI KAGAKU K.K.) was changed to 5 parts by weight, and the cation-modified urethane resin latex was replaced by 20 parts by weight of a cation-modified acrylic resin (trademark: DM-20A, made by ASAHI DENKAKOGYO K.K.).

The test results are shown in Table 1.

Comparative Example 3

An ink jet recording medium was produced by the same procedures as in Example 1 with the following exceptions.

In the preparation of the coating liquid for the ink receiving layer, the mixed silica particles was replaced by a mixture of 30 parts by weight of amorphous silica particles having a specific surface area of 350 $m^2$/g and an average particle size of 3 μm (trademark: MIZUKASIL P-78A, made by MIZUSAWA KAGAKU K.K. with 70 parts by weight of amorphous silica particles having a specific surface area of 400 $m^2$/g and an average particle size of 8 μm (trademark: CARPREX BS-304N, made by SHIONOGI SEIYAKU K.K.); no cationic polyacrylamide resin was employed, and the cation-modified urethane resin latex was replaced by 25 parts by weight of a styrene-butadiene copolymer latex (trademark: NIPPOL OX-1060, made by NIHON ZEON K.K.).

The test results are shown in Table 1.

Comparative Example 4

An ink jet recording medium was produced by the same procedures as in Example 1 with the following exceptions.

In the preparation of the coating liquid for the ink receiving layer, the mixed silica particles was replaced by a mixture of 30 parts by weight of amorphous silica particles having a specific surface area of 250 $m^2$/g and an average particle size of 9 μm (trademark: CARPREX BS-312N, made by SHIONOGI SEIYAKU K.K. with 70 parts by weight of amorphous silica particles having a specific surface area of 400 $m^2$/g and an average particle size of 8 μm (trademark: CARPREX BS-304N, made by SHIONOGI SEIYAKU K.K.); no cationic polyacrylamide resin was employed, and the cation-modified urethane resin latex was replaced by 25 parts by weight of a styrene-butadiene copolymer latex (trademark: NIPPOL OX-1060, made by NIHON ZEON K.K.).

The test results are shown in Table 1.

TABLE 1

| | | Item | | | | | | | | | |
|---|---|---|---|---|---|---|---|---|---|---|---|
| | | Dot size ( ) | | | Dot size ratio (%) | | | Resistance to ink blotting | | | water amount |
| Example No. | | C | B | K | B/C | K/B | K/C | C | B | K | (ml/$m^2$) |
| Example | 1 | 104 | 111 | 114 | 107 | 103 | 110 | A | A | A | 43 |
| | 2 | 108 | 112 | 126 | 104 | 112 | 117 | A | A | A | 40 |
| | 3 | 105 | 121 | 126 | 116 | 104 | 120 | A | A | A | 40 |
| | 4 | 90 | 99 | 109 | 110 | 110 | 121 | A | A | B | 40 |
| | 5 | 91 | 95 | 101 | 104 | 107 | 112 | A | A | A | 40 |
| | 6 | 86 | 92 | 92 | 107 | 100 | 107 | A | A | A | 43 |

TABLE 1-continued

| Example No. | | Item: Dot size ( ) C | B | K | Dot size ratio (%) B/C | K/B | K/C | Resistance to ink blotting C | B | K | water amount ($ml/m^2$) |
|---|---|---|---|---|---|---|---|---|---|---|---|
| | 7 | 95 | 100 | 115 | 105 | 115 | 123 | A | B | B | 15 |
| Comparative Example | 1 | 93 | 106 | 118 | 113 | 111 | 127 | A | B | C | 15 |
| | 2 | 87 | 101 | 114 | 117 | 112 | 132 | A | B | C | 17 |
| | 3 | 85 | 101 | 109 | 119 | 107 | 127 | A | B | C | 15 |
| | 4 | 90 | 110 | 133 | 122 | 121 | 132 | B | C | C | 10 |

Note:
C . . . 100% single cyan-coloring ink dot
B . . . 200% superposed blue (cyan + magenta) coloring ink dot
K . . . 300% superposed black (cyan + magenta + yellow) coloring ink dot Table 1 clearly shows that the ink jet recording mediums of Examples 1 to 7 exhibited excellent resistance of the ink dots to blotting and thus a higher clarity and sharpness of the recorded ink images than those of Comparative Examples 1 to 4.

The ink jet recording medium of the present invention has a high ink absorbing capacity and can record thereon ink images having high color density, clarity and sharpness with a high resolution and with a high reproducibility. Also, the ink jet recording medium of the present invention has a high surface strength, enough for practical use, and exhibit a good pencil-writing performance and a good pencil mark-erasing performance using an erasing rubber.

We claim:

1. A printed ink jet recording medium comprising a support material and at least one ink receiving layer comprising xerogel porous pigment particles and a binder, the ink receiving layer formed on the support material, wherein the xerogel porous pigment particles comprise at least two types of silica particles different in specific surface area from each other, the highest specific surface are amorphous silica particles having a BET specific surface area of 300 to 900 $m^2/g$ and the lowest specific surface are amorphous silica particles having a BET specific surface area of 150 to 450 $m^2/g$ and less than that of the highest specific surface area amorphous silica particles, the binder comprises a mixture of silyl-modified polyvinyl alcohol with at least one member selected from cation-modified urethane resin latices and cation-modified acrylic resin latices, and the ink receiving layer having ink images printed by successively jetting imagewise three coloring ink droplets different in color from each other toward a plurality of target points of the ink receiving layer, to form, in each point, an ink dot having a mixed color produced from the three coloring ink droplets superposed on each other at the points of the ink receiving layer, the received ink dots having an average dot size of 125% or less, based on an average size of ink dots, each of which dots are formed by jetting a droplet of each of the three different coloring inks having a droplet volume equal to that of each of the above-mentioned three coloring ink droplets, toward a plurality of target points of the ink receiving layer, to form a dot having a single color of each ink.

2. The ink jet recording medium as claimed in claim 1, wherein the average dot size of the dots each formed from the three coloring ink droplets is 110% or less, based on the average size of dots each formed by successively jetting two of the three coloring ink droplets toward a point of the ink receiving layer to form a dot having a mixed color of the two coloring ink droplets.

3. The ink jet recording medium as claimed in claim 1, having a density of 0.70 to 0.90 $g/cm^3$.

4. The ink jet recording medium as claimed in claim 1, exhibiting, when distilled water is brought into contact with the ink receiving layer, a distilled water-absorption of 30 $g/m^2$ or more in a contact time of 10 ms determined by a dynamic scanning absorptometer.

5. A method of recording colored images on the ink jet recording medium as claimed in claim 1, using an ink jet recording machine and at least one member selected from the group consisting of yellow coloring inks, cyan coloring inks, magenta-coloring inks and black coloring inks, wherein the recording machine has a maximum ink-jetting amount of 20 $ml/m^2$ or more.

* * * * *